(12) United States Patent
Sawa et al.

(10) Patent No.: US 10,435,533 B2
(45) Date of Patent: Oct. 8, 2019

(54) CARBON MATERIAL, RESIN COMPOSITE MATERIAL, AND METHOD FOR PRODUCING SAID CARBON MATERIAL AND RESIN COMPOSITE MATERIAL

(71) Applicant: SEKISUI CHEMICAL CO., LTD., Osaka, Osaka (JP)

(72) Inventors: Kazuhiro Sawa, Osaka (JP); Taichi Hamada, Osaka (JP); Daisuke Mukohata, Hasuda (JP); Nobuhiko Inui, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 197 days.

(21) Appl. No.: 15/115,681

(22) PCT Filed: Feb. 20, 2015

(86) PCT No.: PCT/JP2015/054767
§ 371 (c)(1),
(2) Date: Jul. 31, 2016

(87) PCT Pub. No.: WO2015/125916
PCT Pub. Date: Aug. 27, 2015

(65) Prior Publication Data
US 2017/0009045 A1 Jan. 12, 2017

(30) Foreign Application Priority Data
Feb. 24, 2014 (JP) .................................. 2014-032867

(51) Int. Cl.
| | | |
|---|---|---|
| C08K 3/04 | (2006.01) | |
| C08L 101/00 | (2006.01) | |
| C09C 1/44 | (2006.01) | |
| C09C 1/46 | (2006.01) | |
| C01B 32/168 | (2017.01) | |
| C01B 32/20 | (2017.01) | |
| C01B 32/215 | (2017.01) | |
| C01B 32/225 | (2017.01) | |
| C01B 32/194 | (2017.01) | |

(52) U.S. Cl.
CPC .............. *C08K 3/04* (2013.01); *C01B 32/168* (2017.08); *C01B 32/194* (2017.08); *C01B 32/20* (2017.08); *C01B 32/215* (2017.08); *C01B 32/225* (2017.08); *C08K 3/041* (2017.05); *C08K 3/042* (2017.05); *C09C 1/44* (2013.01); *C09C 1/46* (2013.01)

(58) Field of Classification Search
CPC ....... C08K 3/04; C01B 31/0253; C01B 31/04; C01B 31/0407; C01B 31/0423; C01B 31/0484; C09C 1/44; C09C 1/46
USPC ......................................................... 524/584
See application file for complete search history.

(56) References Cited

U.S. PATENT DOCUMENTS

| | | | | |
|---|---|---|---|---|
| 4,915,925 A | * | 4/1990 | Chung ................... | D01F 11/14 252/378 R |
| 2010/0078596 A1 | | 4/2010 | Sonobe | |
| 2013/0123415 A1 | | 5/2013 | Tanaka et al. | |
| 2013/0200311 A1 | | 8/2013 | Tanaka et al. | |
| 2014/0058046 A1 | | 2/2014 | Sawa et al. | |
| 2014/0378599 A1 | | 12/2014 | Sawa et al. | |

FOREIGN PATENT DOCUMENTS

| | | | | |
|---|---|---|---|---|
| CN | 10255701 A | | 7/2012 | |
| EP | 0 268 397 A1 | | 5/1988 | |
| EP | 0268397 A1 | * | 5/1988 | ............. H01M 4/96 |
| GB | 2128629 A | * | 5/1984 | ......... C10M 103/02 |
| JP | 55047217 A | * | 4/1980 | .......... C04B 14/022 |
| JP | 60-30102 A | | 2/1985 | |
| JP | 60030102 A | * | 2/1985 | |
| JP | 2008-239640 A | | 10/2008 | |
| JP | 2009-160754 A | | 7/2009 | |
| JP | 2010-45025 A | | 2/2010 | |
| JP | 2010045025 A | * | 2/2010 | |
| JP | 2010-77300 A | | 4/2010 | |
| JP | 2012-236960 A | | 12/2012 | |
| JP | 2013-231158 A | | 11/2013 | |
| RU | 2011 130 445 A | | 1/2013 | |
| WO | WO-2012/124010 A1 | | 9/2012 | |

(Continued)

OTHER PUBLICATIONS

Pallozzi ["Carbon fiber reinforcement of epoxy resins", SPE Journal, Society of Plastics Engineers (SPE), Stamford, CT, United States, vol. 22, No. 2, Feb. 1966 (Feb. 1966), pp. 80-82] (Year: 1966).*
Pallozzi, A. A., "Carbon Fiber Reinforcement of Epoxy Resins", SPE Journal, Society of Plastics Engineers (SPE), 1966, vol. 22, No. 2, pp. 80-82.
Database WPI, Week 201369, Thomson Scientific, London, GB; AN 2013-Q36323, XP002771446 (and RU 2011 130 445 A).
Database WPI, Week 198513, Thomson Scientific, London, GB; AN 1985-077736, XP002771447 (and JP 80-30102 A).

(Continued)

*Primary Examiner* — Kelechi C Egwim
(74) *Attorney, Agent, or Firm* — Cheng Law Group, PLLC

(57) ABSTRACT

Provided is a resin composite material having a small number of voids and excellent tenacity. The resin composite material may be one obtained by mixing a carbon material having a graphene structure and having a content of less than 1 weight % of a volatile component volatilizable at 200° C. and a thermoplastic resin. The resin composite material may be a resin composite material including a carbon material having a graphene structure and a thermoplastic resin, the resin composite material containing 5 parts by weight or more of the carbon material per 100 parts by weight of the thermoplastic resin and having a breaking strain of 50% or more as measured according to JIS K 7161.

9 Claims, No Drawings

(56) References Cited

FOREIGN PATENT DOCUMENTS

WO     WO-2013/058181 A1     4/2013

OTHER PUBLICATIONS

Database WPI, Week 201258, Thomson Scientific, London, GB; AN 2012-K69748, XP002771448 (and CN 102557011 A).

* cited by examiner

CARBON MATERIAL, RESIN COMPOSITE MATERIAL, AND METHOD FOR PRODUCING SAID CARBON MATERIAL AND RESIN COMPOSITE MATERIAL

TECHNICAL FIELD

The present invention relates to a carbon material having a graphene structure, a resin composite material obtained by mixing the carbon material and a thermoplastic resin, and methods for producing the carbon material and the resin composite material.

BACKGROUND ART

It has been conventionally known that carbon materials having a graphene structure, such as graphite, carbon nanotube, graphene, and exfoliated graphite, can improve the physical properties of resins by dispersing them in the resins.

For example, Patent Literature 1 listed below discloses a composite material including an olefin resin and finely-divided graphite particles dispersed in the olefin resin. Patent Literature 1 teaches that adding finely-divided graphite particles to an olefin resin can impart physical properties such as electrical conductivity, thermal conductivity, and high elastic modulus to the olefin resin.

Patent Literature 2 listed below discloses a method for producing a resin composite material, in which a resin composition including a resin and a carbon material having a graphene structure is subjected to a shear force under predetermined conditions and then kneaded. Patent Literature 2 teaches that the production method is capable of yielding a resin composite material with enhanced mechanical strength.

CITATION LIST

Patent Literature

Patent Literature 1
  Japanese Patent Laid-Open No. 2012-236960
Patent Literature 2
  Japanese Patent Laid-Open No. 2013-231158

SUMMARY OF INVENTION

Technical Problem

For the composite material of Patent Literature 1 or Patent Literature 2, however, adding a carbon material having a graphene structure to a resin tends to decline the tenacity of the resulting resin composite material, although such addition allows the resin composite material to have, for example, higher mechanical strength than the resin itself. Furthermore, the resulting resin composite material may be observed to have a large number of voids when formed into a sheet or fabricated. The void as defined herein is a recess having a diameter of 0.1 mm or more.

An object of the present invention is to provide a carbon material capable of yielding, when combined with a resin, a resin composite material having a small number of voids and excellent tenacity; and a method for producing the carbon material.

Another object of the present invention is to provide a resin composite material having a small number of voids and excellent tenacity and a method for producing the resin composite material.

Solution to Problem

As a result of diligent study, the present inventors have found that a resin composite material obtained by mixing a carbon material having a graphene structure and having a content of less than 1 weight % of a volatile component volatilizable at 200° C. and a resin can achieve the above object. This finding has led the inventors to make the present invention.

That is, a carbon material according to the present invention has a graphene structure and has a content of less than 1 weight % of a volatile component volatilizable at 200° C.

Preferably, the carbon material according to the present invention is at least one selected from the group consisting of carbon nanotube, carbon fiber, graphite, exfoliated graphite, and graphene.

A resin composite material according to the present invention is a resin composite material obtained by mixing the carbon material and a thermoplastic resin.

It is preferable that the resin composite material according to the present invention contains 5 parts by weight or more of the carbon material per 100 parts by weight of the thermoplastic resin, wherein a sheet formed from the resin composite material having dimensions of 15 cm×15 cm×1 mm has three or less voids in a surface thereof generated when the sheet is left under vacuum at an ambient temperature for 1 hour, the ambient temperature being equal to or higher than a melting point of the thermoplastic resin in the case of a crystalline resin, or equal to or higher than a Tg of the thermoplastic resin in the case of an amorphous resin.

In the present invention, the melting point of a crystalline resin refers to a melting peak temperature measured by differential scanning calorimetry (DSC) according to JIS K 7121. The Tg of an amorphous resin refers to a midpoint glass transition temperature measured by DSC according to JIS K 7121.

Preferably, the resin composite material according to the present invention contains 5 parts by weight or more of the carbon material per 100 parts by weight of the thermoplastic resin and has a breaking strain of 50% or more as measured according to JIS K 7161.

In another broad aspect, the resin composite material according to the present invention is a resin composite material including a carbon material having a graphene structure and a thermoplastic resin, wherein the resin composite material contains 5 parts by weight or more of the carbon material per 100 parts by weight of the thermoplastic resin and wherein a sheet formed from the resin composite material having dimensions of 15 cm×15 cm×1 mm has three or less voids in a surface thereof generated when the sheet is left under vacuum at an ambient temperature for 1 hour, the ambient temperature being equal to or higher than a melting point of the thermoplastic resin in the case of a crystalline resin, or equal to or higher than a Tg of the thermoplastic resin in the case of an amorphous resin. Preferably, the carbon material is at least one selected from the group consisting of carbon nanotube, carbon fiber, graphite, exfoliated graphite, and graphene.

In another broad aspect of the resin composite material according to the present invention is a resin composite material including a carbon material having a graphene structure and a thermoplastic resin, the resin composite material containing 5 parts by weight or more of the carbon material per 100 parts by weight of the thermoplastic resin and having a breaking strain of 50% or more as measured according to JIS K 7161. Preferably, the carbon material having a graphene structure is at least one selected from the group consisting of carbon nanotube, carbon fiber, graphite, exfoliated graphite, and graphene.

Preferably, the resin composite material according to the present invention contains 50 parts by weight or less of the carbon material per 100 parts by weight of the thermoplastic resin.

In the resin composite material according to the present invention, the thermoplastic resin is preferably a polyolefin.

In the resin composite material according to the present invention, the thermoplastic resin is preferably polypropylene.

A method for producing a carbon material according to the present invention includes drying a carbon material having a graphene structure so that the carbon material has a content of less than 1 weight % of a volatile component volatilizable at 200° C. Preferably, the carbon material having a graphene structure is at least one selected from the group consisting of carbon nanotube, carbon fiber, graphite, exfoliated graphite, and graphene.

A method for producing a resin composite material according to the present invention includes the steps of: obtaining a carbon material by the above method for producing a carbon material; and obtaining a resin composite material by mixing the carbon material and a thermoplastic resin.

Advantageous Effects of Invention

The method for producing a carbon material according to the present invention is capable of yielding a carbon material having a graphene structure and having a content of less than 1 weight % of a volatile component volatilizable at 200° C. Additionally, it is possible to obtain a resin composite material having a small number of voids and excellent tenacity by mixing the carbon material and a thermoplastic resin.

DESCRIPTION OF EMBODIMENTS

The details of the present invention will now be described.
(Carbon Material)

A carbon material according to the present invention has a graphene structure and has a content of less than 1 weight % of a volatile component volatilizable at 200° C. At least one selected from the group consisting of carbon nanotube, carbon fiber, graphite, exfoliated graphite, and graphene is suitable for use as the carbon material having a graphene structure.

The exfoliated graphite, as defined herein, is a stack of graphene sheets. The exfoliated graphite is obtained by exfoliating graphite. That is, the exfoliated graphite is a stack of graphene sheets that is thinner than the graphite to be exfoliated.

The number of stacked graphene sheets in the exfoliated graphite is two or more. In view of effective improvement in the mechanical strength such as tensile elastic modulus of a resin, the number of stacked graphene sheets is preferably 100 or less and more preferably 30 or less. The exfoliated graphite that has a smaller number of stacked graphene sheets can provide more effective improvement in stiffness properties such as tensile elastic modulus.

The exfoliated graphite has a structure composed of thin graphene sheets stacked on one another. The exfoliated graphite thus has a relatively high aspect ratio. In the present invention, the aspect ratio of the exfoliated graphite refers to the ratio of the maximum size of the exfoliated graphite in the direction of the plane of the stacked sheets to the thickness of the exfoliated graphite.

Too low an aspect ratio of the exfoliated graphite may result in insufficient reinforcing effect against a force applied in a direction crossing the plane of the stacked sheets. An excessively high aspect ratio of the exfoliated graphite may cause saturation of the reinforcing effect and thus any further reinforcing effect may not be expected in some cases. The preferred lower limit and upper limit of the aspect ratio of the exfoliated graphite are therefore about 5 and about 100, respectively.

The method for producing the exfoliated graphite is not particularly limited, and the exfoliated graphite can be produced by a conventionally-known method. Examples of the method for obtaining the exfoliated graphite include: a chemical treatment method consisting of insertion of ions such as nitrate ions between the layers of graphite and the subsequent heat treatment; a physical treatment method consisting, for example, of application of ultrasonic wave to graphite; and an electrochemical method consisting of electrolysis using graphite as a working electrode. Commercially-available exfoliated graphite may be used.

In the present invention, the carbon material has a content of less than 1 weight % of a volatile component volatilizable at 200° C. The volatile component is not particularly limited, and examples thereof include water. When the volatile component is water, the content of the volatile component refers to water content. The water content, as defined herein, is an index of what amount of water is contained in the carbon material at 30° C. in terms of weight %. The water content can be determined by thermogravimetric analysis described in the examples given later.

A resin composite material can be typically obtained by mixing a carbon material and a resin at a high temperature. If the carbon material having a water content of 1 weight % or more is mixed with a resin, bubbles are likely to be formed. The bubbles may cause the formation of voids, or act as origins of breaking when the obtained resin composite material is formed into a sheet and the sheet is then stretched. The water content is preferably less than 0.8 weight % and more preferably less than 0.5 weight %.

The carbon material according to the present invention can be produced by drying a carbon material having a graphene structure so that the carbon material has a water content of less than 1 weight %.

The drying temperature is not particularly limited, but the drying is desirably performed at 200° C. to 300° C. This is because a temperature lower than 200° C. may result in insufficient drying, while a temperature higher than 300° C. may cause thermal degradation of the resin grafted on the carbon material.

The drying time is not particularly limited either, but is preferably 1 to 2 hours. The drying is desirably performed in a nitrogen atmosphere.

(Resin Composite Material)

A resin composite material according to the present invention is obtained by mixing the above-described carbon material according to the present invention and a thermoplastic resin. Combining the carbon material with a resin is less likely to be accompanied by the formation of bubbles since the water content of the carbon material is less than 1 weight %. This means a decrease in the likelihood of formation of above-described voids and origins of breaking which may be formed when the resin composite material is formed into a sheet and the sheet is then stretched. A smaller number of origins of breaking represents a smaller decline in breaking strain. It is therefore possible to provide a resin composite material having excellent tenacity.

The thermoplastic resin is not particularly limited and a conventionally-known crystalline polymer or an amorphous polymer can be used. For example, a polyolefin can be used. The polyolefin is not particularly limited, and examples thereof include: polyethylene; polypropylene; polyethylene resins such as ethylene homopolymer, ethylene-α-olefin copolymer, ethylene-(meth)acrylic acid copolymer, ethylene-(meth)acrylic acid ester copolymer, and ethylene-vinyl acetate copolymer; polypropylene resins such as propylene homopolymer and propylene-α-olefin copolymer; butene homopolymer; and homopolymers or copolymers of conjugated dienes such as butadiene and isoprene. Preferred is polypropylene. The polypropylene to be used is more preferably polypropylene that has a melt flow rate (MFR) in the range of 0.5 to 5.0 g/10 minutes (as measured at a temperature of 230° C. under a load of 2.16 kgf according to JIS K 7210). The use of such polypropylene allows highly-productive extrusion molding.

The resin composite material according to the present invention preferably contains 5 parts by weight to 50 parts by weight of a carbon material having a graphene structure per 100 parts by weight of the resin. The content of such a carbon material is more preferably 5 parts by weight to 20 parts by weight. The content of the carbon material is even more preferably 5 parts by weight to 10 parts by weight. This is because too less carbon material may result in a failure to effectively improve the mechanical strength such as tensile elastic modulus, while too much carbon material may cause a decline in the tenacity such as breaking strain.

The resin composite material according to the present invention is preferably a resin composite material such that a sheet formed from the resin composite material having dimensions of 15 cm×15 cm×1 mm has three or less voids in a surface thereof generated when the sheet is left under vacuum for 1 hour. The ambient temperature at which the resin composite material is left under vacuum for 1 hour is equal to or higher than the melting point of the thermoplastic resin when the thermoplastic resin is a crystalline resin. When the thermoplastic resin is an amorphous resin, the ambient temperature is equal to or higher than the Tg of the thermoplastic resin. The voids as defined herein are at least large enough to be perceived with the unaided eye.

The resin composite material according to the present invention may not be one produced by using the above-described carbon material according to the present invention, insofar as the resin composite material contains 5 parts by weight or more of a carbon material having a graphene structure per 100 parts by weight of the resin and the number of voids generated in a surface thereof as described above is three or less. That is, another method may be used to produce the resin composite material. This is because a composite material having excellent tenacity can be provided if the number of voids acting as origins of breaking is small. Also in this case, the ambient temperature at which the resin composite material is left under vacuum for 1 hour is equal to or higher than the melting point of the thermoplastic resin when the thermoplastic resin is a crystalline resin, and the ambient temperature is equal to or higher than the Tg of the thermoplastic resin when the thermoplastic resin is an amorphous resin. At least one selected from the group consisting of carbon nanotube, carbon fiber, graphite, exfoliated graphite, and graphene is suitable for use as the carbon material having a graphene structure.

The resin composite material according to the present invention preferably has a breaking strain of 50% or more as measured according to JIS K 7161. Having a breaking strain of 50% or more is defined herein to mean that the minimum value of the breaking strain measured according to JIS K 7161 is 50% or more.

The resin composite material according to the present invention may not be one produced by using the above-described carbon material according to the present invention, also insofar as the resin composite material contains 5 parts by weight of a carbon material having a graphene structure per 100 parts by weight of the thermoplastic resin and has a breaking strain of 50% or more as measured according to JIS K 7161. This is because having a breaking strain of 50% or more means that the number of voids acting as origins of breaking is small. Thus, a resin composite material having a small number of voids and excellent tenacity can be provided. At least one selected from the group consisting of carbon nanotube, carbon fiber, graphite, exfoliated graphite, and graphene is suitable for use as the carbon material having a graphene structure.

In the resin composite material according to the present invention, various additives may he used as optional components in addition to the essential components described above. Examples of the additives include: antioxidants such as those based on phenol, phosphorus, amine, or sulfur; ultraviolet absorbers such as those based on benzotriazole or hydroxyphenyltriazine; metal inhibitors; halogenated flame retardants such as hexabromobiphenyl ether and decabromodiphenyl ether; flame retardants such as ammonium polyphosphate and trimethyl phosphate; various fillers; antistatic agents; stabilizers; and pigments.

(Method for Producing Resin Composite Material)

In a method for producing a resin composite material according to the present invention, first, a carbon material having a graphene structure is dried so that it has a water content of less than 1 weight %. The resulting carbon material and a thermoplastic resin are then mixed to obtain a resin composite material.

The method for mixing the carbon material and the thermoplastic resin is not particularly limited, but an example of the method used is hot-melt kneading at a high temperature. The kneading is preferably performed at a temperature which causes no thermal degradation of the resin.

The kneading time is not particularly limited either, but is preferably 1 to 5 minutes. This is because too short a kneading time may result in poor dispersing of the carbon material, while too long a kneading time may cause thermal degradation of the resin.

The kneading method is not particularly limited either, but examples thereof include a method in which the kneading is performed under heating using a kneading apparatus as exemplified by: a twin-screw kneader such as Plast Mill; a single-screw extruder; a twin-screw extruder; a Banbury mixer; and a roll mill. Among such methods, hot-melt kneading performed using Plast Mill is preferred.

Furthermore, the resin composite material obtained by the present invention can be formed into various shapes using appropriate forming methods. Such forming methods suitable for use include pressing, injection molding, and extrusion molding. The forming may be accomplished also by hot-melt coating. A desired shape such as a sheet shape can be formed using such methods as mentioned above.

EXAMPLES AND COMPARATIVE EXAMPLES

Hereinafter, the present invention will be further described based on specific examples. It should be noted that the present invention is not limited to the examples given below.

(Preparation of Dry Exfoliated Graphite)

Exfoliated graphite manufactured by XG Sciences, Inc. under the trade name "xGnP-M5" was used. The average size in the plane direction of the layer surface was about 5.0 μm, and the layer thickness was about 60 nm, as observed with a scanning electron microscope (SEM) before use. The number of stacked graphene layers was about 180, and the BET specific surface area was 75 m$^2$/g.

The exfoliated graphite was dried in a nitrogen atmosphere at 200° C. for 1 hour to obtain dry exfoliated graphite A. Similarly, dry exfoliated graphite B to D were obtained by drying the exfoliated graphite under the conditions shown in Table 1 below. Dry carbon nanotubes G and H were obtained. The obtained dry exfoliated graphite A to D, dry graphite E and F, and carbon nanotubes G and H were subjected to thermogravimetric analysis (TGA) in an air atmosphere with a temperature increase of 10° C./minute at temperatures in the range of 30 to 200° C. Their water contents were each determined by the formula below, where the weight of the exfoliated graphite at 30° C. was defined as weight A and the amount of a component volatilized until the temperature reached 200° C. was defined as weight B.

Water content (weight %)=($B/A$)×100

(Preparation of Dry Graphite)

Graphite manufactured by SEC CARBON, LIMITED under the trade name "SNO 5" was used. The average size in the plane direction of the layer surface was about 5.0 μm, and the layer thickness was about 500 nm, as observed with a scanning electron microscope (SEM) before use. The number of stacked graphene layers was about 1500, and the BET specific surface area was 16 m$^2$/g.

The above graphite was dried in a nitrogen atmosphere under the conditions shown in Table 1 below to obtain dry graphite E and F. The obtained graphite E and F were subjected to thermogravimetric analysis (TGA) in an air atmosphere with a temperature increase of 10° C./minute at temperatures in the range of 30 to 200° C. Their water contents were each determined by the above formula, where the weight of the graphite at 30° C. was defined as weight A and the amount of water volatilized until the temperature reached 200° C. was defined as weight B.

(Preparation of Dry Carbon Nanotubes)

A carbon nanotube manufactured by CNT, Co., Ltd. under the trade name "Ctube-100" was used. Its average diameter was 10 to 40 cm, its average length was 13 nm, and its BET specific surface area was 150 m$^2$/g.

The carbon nanotube was dried in a nitrogen atmosphere under the conditions shown in Table 1 below to obtain dry carbon nanotubes G and H. The obtained carbon nanotubes G and H were subjected to thermogravimetric analysis (TGA) in an air atmosphere with a temperature increase of 10° C./minute at temperatures in the range of 30 to 200° C. Their water contents were each determined by the above formula, where the weight of the carbon nanotube at 30° C. was defined as weight A and the amount of water volatilized until the temperature reached 200° C. was defined as weight B.

The results are shown in the following Table 1.

TABLE 1

| | Drying conditions | | Evaluation |
|---|---|---|---|
| | Temperature | Time (hr) | Water content (%) |
| Dry exfoliated graphite A | 200 | 1 | 0.6 |
| Dry exfoliated graphite B | 230 | 1 | 0.5 |
| Dry exfoliated graphite C | 23 | 1 | 2.1 |
| Dry exfoliated graphite D | 100 | 1 | 1.8 |
| Dry graphite E | 230 | 1 | 0.3 |
| Dry graphite F | 100 | 1 | 1.2 |
| Dry carbon nanotube G | 230 | 1 | 0.6 |
| Dry carbon nanotube H | 100 | 1 | 1.9 |

Example 1

A resin composite material was obtained by mixing 100 parts by weight of a polypropylene resin (manufactured by Prime Polymer Co., Ltd. under the trade name "E-150GK" and having a MFR of 0.6 g/10 minutes and a breaking strain of 600% or more) and 10 parts by weight of the dry exfoliated graphite A at 180° C. for 3 minutes using Labo Plast Mill (manufactured by TOYO SEIKI Co., Ltd. under the trade name "R-100"). Subsequently, the resin composite material obtained was formed into a sheet by pressing. Thus, a resin composite material sheet having a thickness of 1.0 mm was prepared.

Example 2

A resin composite material sheet having a thickness of 1.0 mm was prepared in the same manner as in Example 1, except for using 20 parts by weight of the dry exfoliated graphite A instead of 10 parts by weight of the dry exfoliated graphite A.

Example 3

A resin composite material sheet having a thickness of 1.0 mm was prepared in the same manner as in Example 1, except for using the dry exfoliated graphite B instead of the dry exfoliated graphite A.

Example 4

A resin composite material sheet having a thickness of 1.0 mm was prepared in the same manner as in Example 3, except for using 50 parts by weight of the dry exfoliated graphite B instead of 10 parts by weight of the dry exfoliated graphite B.

Example 5

A resin composite material sheet having a thickness of 1.0 mm was prepared in the same manner as in Example 1, except for using the dry graphite E instead of the dry exfoliated graphite A.

Example 6

A resin composite material sheet having a thickness of 1.0 mm was prepared in the same manner as in Example 5, except for using 20 parts by weight of the dry graphite E instead of 10 parts by weight of the dry graphite E.

Example 7

A resin composite material sheet having a thickness of 1.0 mm was prepared in the same manner as in Example 1, except for using the dry carbon nanotube G instead of the dry exfoliated graphite A.

Example 8

A resin composite material sheet having a thickness of 1.0 mm was prepared in the same manner as in Example 7, except for using 20 parts by weight of the dry carbon nanotube G instead of 10 parts by weight of the dry carbon nanotube G.

Example 9

A resin composite material sheet having a thickness of 1.0 mm was prepared in the same manner as in Example 1, except for using a high-density polyethylene resin (manufactured by Japan Polyethylene Corporation under the trade name "HF560" and having a MFR of 7.0 g/10 minutes and a breaking strain of 400% or more) instead of the polypropylene resin.

Example 10

A resin composite material sheet having a thickness of 1.0 mm was prepared in the same manner as in Example 10, except for using 20 parts by weight of the dry exfoliated graphite B instead of 10 parts by weight of the dry exfoliated graphite A.

Example 11

A resin composite material sheet having a thickness of 1.0 mm was prepared in the same manner as in Example 1, except for using a polycarbonate resin (manufactured by Mitsubishi Engineering-Plastics Corporation under the trade name "H-3000" and having a MFR of 30 g/10 minutes and a breaking strain of 100% or more) instead of the polypropylene resin.

Example 12

A resin composite material sheet having a thickness of 1.0 mm was prepared in the same manner as in Example 11, except for using 20 parts by weight of the dry exfoliated graphite B instead of 10 parts by weight of the dry exfoliated graphite A.

Comparative Example 1

A resin composite material sheet having a thickness of 1.0 mm was prepared in the same manner as in Example 1, except for using the dry exfoliated graphite C instead of the dry exfoliated graphite A.

Comparative Example 2

A resin composite material sheet having a thickness of 1.0 mm was prepared in the same manner as in Example 2, except for using the dry exfoliated graphite C instead of the dry exfoliated graphite A.

Comparative Example 3

A resin composite material sheet having a thickness of 1.0 mm was prepared in the same manner as in Example 1, except for using the dry exfoliated graphite D instead of the dry exfoliated graphite A.

Comparative Example 4

A resin composite material sheet having a thickness of 1.0 mm was prepared in the same manner as in Comparative Example 3, except for using 50 parts by weight of the dry exfoliated graphite D instead of 10 parts by weight of the dry exfoliated graphite D.

Comparative Example 5

A resin composite material sheet having a thickness of 1.0 mm was prepared in the same manner as in Comparative Example 1, except for using the dry graphite F instead of the dry exfoliated graphite C.

Comparative Example 6

A resin composite material sheet having a thickness of 1.0 mm was prepared in the same manner as in Comparative Example 5, except for using 20 parts by weight of the dry graphite F instead of 10 parts by weight of the dry graphite F.

Comparative Example 7

A resin composite material sheet having a thickness of 1.0 mm was prepared in the same manner as in Comparative Example 1, except for using the dry carbon nanotube H instead of the dry exfoliated graphite C.

Comparative Example 8

A resin composite material sheet having a thickness of 1.0 mm was prepared in the same manner as in Comparative Example 7, except for using 20 parts by weight of the dry carbon nanotube H instead of 10 parts by weight of the dry carbon nanotube H.

Comparative Example 9

A resin composite material sheet having a thickness of 1.0 mm was prepared in the same manner as in Example 9, except for using the dry exfoliated graphite C instead of the dry exfoliated graphite A.

Comparative Example 10

A resin composite material sheet having a thickness of 1.0 mm was prepared in the same manner as in Comparative Example 9, except for using 20 parts by weight of the dry exfoliated graphite C instead of 10 parts by weight of the dry exfoliated graphite C.

Comparative Example 11

A resin composite material sheet having a thickness of 1.0 mm was prepared in the same manner as in Example 11, except for using the dry exfoliated graphite C instead of the dry exfoliated graphite A.

Comparative Example 12

A resin composite material sheet having a thickness of 1.0 mm was prepared in the same manner as in Comparative Example 11, except for using 20 parts by weight of the dry exfoliated graphite C instead of 10 parts by weight of the dry exfoliated graphite C.

Evaluation of Examples and Comparative Examples

Number of voids: The resin composite material sheets obtained were left in an oven adjusted to −0.1 MPa for 1 hour, at 180° C. for the resin composite material sheets of Examples 1 to 10 and Comparative Examples 1 to 10 and at 250° C. for the resin composite sheets of Examples 11 and 12 and Comparative Examples 11 and 12. After that, the number of voids was visually confirmed.

Breaking strain: Five pieces of No. 1 dumbbell sample were punched out of each of the resin composite material sheets obtained in Examples 1 to 12 and Comparative Examples 1 to 12. The obtained samples were measured for breaking strain at 23° C. according to JIS K 7161 (N=5). The minimum of the obtained five values of the breaking strain was employed as the breaking strain of the resin composite material sheet.

TABLE 2

| | Resin | | | Dry exfoliated graphite | | | | | | | | Evaluation | |
|---|---|---|---|---|---|---|---|---|---|---|---|---|---|
| | Polypropylene resin | High-density polyethylene resin | Polycarbonate resin | A | B | C | D | E | F | G | H | Number of voids | Breaking strain (%) |
| Ex. 1 | 100 | | | 10 | | | | | | | | 1 | 110 |
| Ex. 2 | 100 | | | 20 | | | | | | | | 2 | 56 |
| Ex. 3 | 100 | | | | 10 | | | | | | | 0 | 120 |
| Ex. 4 | 100 | | | | 50 | | | | | | | 2 | 51 |
| Ex. 5 | 100 | | | | | | | 10 | | | | 0 | 153 |
| Ex. 6 | 100 | | | | | | | 20 | | | | 1 | 121 |
| Ex. 7 | 100 | | | | | | | | | 10 | | 0 | 120 |
| Ex. 8 | 100 | | | | | | | | | 20 | | 1 | 75 |
| Ex. 9 | | 100 | | 10 | | | | | | | | 1 | 283 |
| Ex. 10 | | 100 | | 20 | | | | | | | | 2 | 181 |
| Ex. 11 | | | 100 | 10 | | | | | | | | 1 | 77 |
| Ex. 12 | | | 100 | 20 | | | | | | | | 2 | 53 |
| Comp. Ex. 1 | 100 | | | | | 10 | | | | | | 20 | 28 |
| Comp. Ex. 2 | 100 | | | | | 20 | | | | | | 35 | 13 |
| Comp. Ex. 3 | 100 | | | | | | 10 | | | | | 13 | 35 |
| Comp. Ex. 4 | 100 | | | | | | 50 | | | | | 45 | 8 |
| Comp. Ex. 5 | 100 | | | | | | | | 10 | | | 12 | 45 |
| Comp. Ex. 6 | 100 | | | | | | | | 20 | | | 21 | 35 |
| Comp. Ex. 7 | 100 | | | | | | | | | | 10 | 19 | 31 |
| Comp. Ex. 8 | 100 | | | | | | | | | | 20 | 31 | 11 |
| Comp. Ex. 9 | | 100 | | | | 10 | | | | | | 19 | 48 |
| Comp. Ex. 10 | | 100 | | | | 20 | | | | | | 34 | 43 |
| Comp. Ex. 11 | | | 100 | | | 10 | | | | | | 18 | 22 |
| Comp. Ex. 12 | | | 100 | | | 20 | | | | | | 32 | 10 |

In Examples 1 to 12, the number of voids was small and specifically less than 3, which was because the dry exfoliated graphite A and B, the dry graphite E, and the dry carbon nanotube G each had a low water content less than 1 weight %. The high breaking strains of the resin composite material sheets can be attributed to the small number of voids which may act as origins of breaking. By contrast, in Comparative Examples 1 to 12 employing any one of the dry exfoliated graphite C and D, the dry graphite F, and the dry carbon nanotube H each of which had a water content of 1 weight % or more, a large number of voids were observed and the breaking strains were found to be low.

The invention claimed is:

1. A carbon material having a graphene structure and having a content of 0.3 weight % or more and less than 1 weight % of a volatile component volatilizable at 200° C., wherein the carbon material is at least one selected from the group consisting of exfoliated graphite and graphene.

2. A resin composite material obtained by mixing the carbon material according to claim 1 and a thermoplastic resin.

3. The resin composite material according to claim 2, wherein the resin composite material contains 5 parts by weight or more of the carbon material per 100 parts by weight of the thermoplastic resin, and
wherein a sheet formed from the resin composite material having dimensions of 15 cm×15 cm×1 mm has three or less voids in a surface thereof generated when the sheet is left under vacuum at an ambient temperature for 1 hour, the ambient temperature being equal to or higher than a melting point of the thermoplastic resin in the case of a crystalline resin, or equal to or higher than a Tg of the thermoplastic resin in the case of an amorphous resin.

4. The resin composite material according to claim 2, wherein the resin composite material contains 5 parts by weight or more of the carbon material per 100 parts by weight of the thermoplastic resin and has a breaking strain of 50% or more as measured according to JIS K 7161.

5. The resin composite material according to claim 2, wherein the resin composite material contains 50 parts by weight or less of the carbon material per 100 parts by weight of the thermoplastic resin.

6. The resin composite material according to claim 2, wherein the thermoplastic resin is a polyolefin.

7. The resin composite material according to claim 6, wherein the thermoplastic resin is polypropylene.

8. The carbon material according to claim 1, wherein the carbon material is obtained by heating a starting material comprising exfoliated graphite or graphene in a nitrogen atmosphere at a temperature of 200° C. to 230° C. for an hour.

9. The carbon material according to claim 8, wherein, the exfoliated graphite or graphene of the starting material has an average size in a plane direction of a layer surface of about 5.0 μm.

* * * * *